United States Patent Office 3,118,648
Patented Jan. 21, 1964

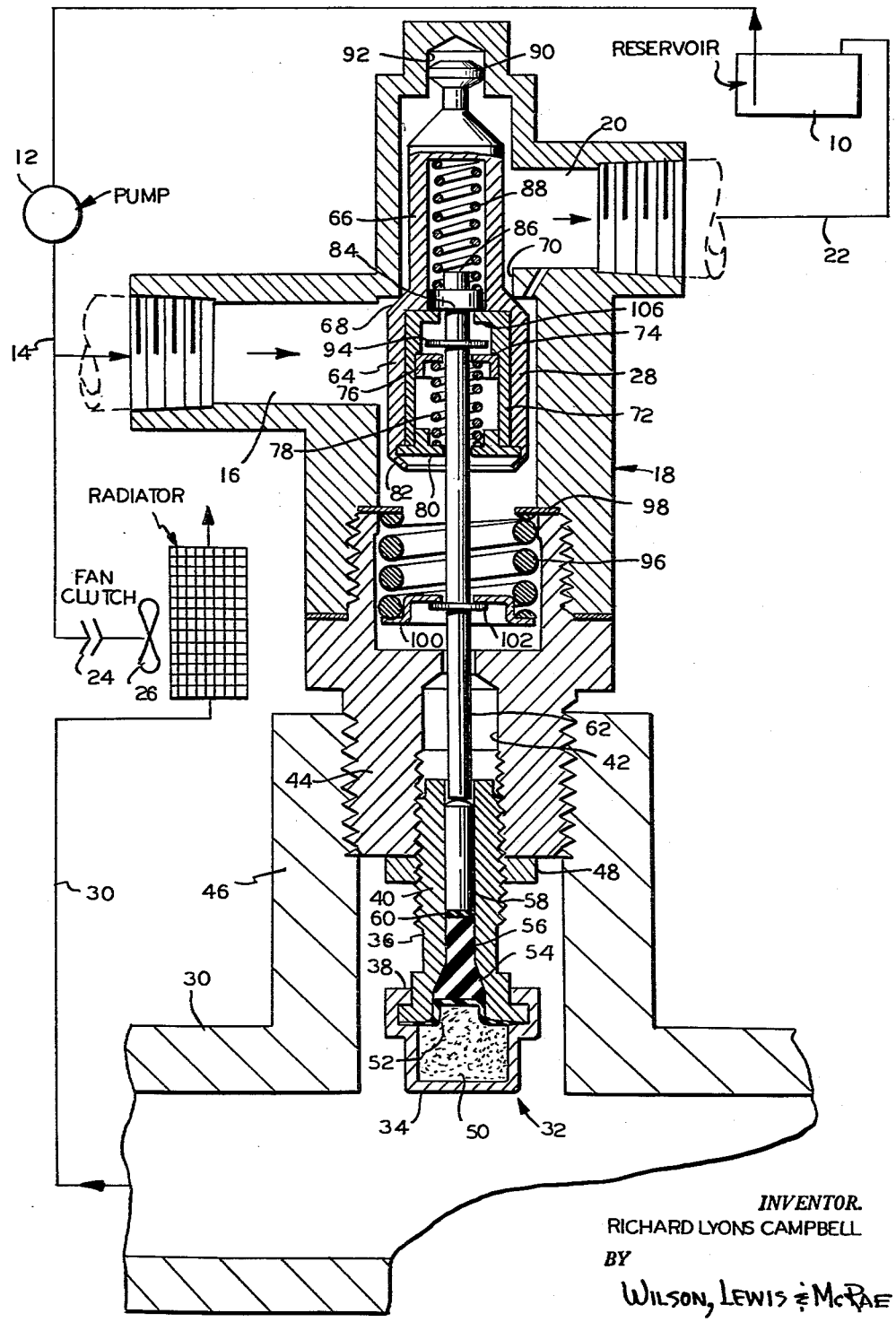

3,118,648
THERMOSTATIC FLOW CONTROL VALVE
Richard Lyons Campbell, Birmingham, Mich., assignor to American Radiator & Standard Sanitary Corporation, New York, N.Y., a corporation of Delaware
Substituted for abandoned application Ser. No. 3,789, Jan. 21, 1960. This application Feb. 20, 1963, Ser. No. 260,351
2 Claims. (Cl. 251—77)

This is a substitute application for application Serial No. 3,789, filed January 21, 1960, and now abandoned.

This invention relates to flow control valve means, and particularly such valve means having a snap action of the valve element, preferably during both the closing and opening movements of the valve element. The invention has application in many installations, but as an example the invention may be utilized in automotive vehicles to control flow of oil to the clutch of the air fan, the arrangement being such that the clutch is engaged and disengaged according to radiator temperature so as to permit economies in power input, the ultimate aim of course being to enable the automobile engine to utilize its power output to the best advantage and with improved economy of operation.

In the automotive application discussed above, the operation of the clutch is improved if the valve which controls the oil flow is opened and closed with a snap action in such manner as to provide instantaneous engagement and disengagement of the clutch. The flow to the clutch is under pressure, and considerable operating force is required to open and close the valve element in the oil line. This operating force requirement necessitates the use of a high strength thermostatic power element as the controller for the valve element. Thermostatic power elements of the so-called "solid fill" type have been developed for providing large operating forces. However these power elements are inherently of modulating operation such that it is impractical to attempt to obtain a snap action by means of a direct connection between the power element and valve element.

With the above discussion in view, it is an object of the present invention to provide a flow control means wherein the valve element thereof is moved with a snap action and wherein the controlling force for the valve element is of a relatively high strength character so as to adapt the flow control means to installations having high fluid pressures.

A further object of the invention is to provide a flow control means of the above-mentioned character wherein a novel lost motion connection is utilized between the operator and valve element to permit the desired snap action.

A further object of the invention is to provide a snap acting valve structure which utilizes as the motive force a high strength, modulating response thermostatic power element.

Another object of the invention is to provide a snap acting valve structure of relatively simple low cost construction.

An additional object is to provide a snap acting valve structure which has a snap motion in both its closing movement and in its opening movement.

Other objects of this invention will appear in the following description and appended claims, reference being had to the accompanying drawings forming a part of this specification wherein like reference characters designate corresponding parts in the several views.

In the drawings the single figure is a sectional view through one embodiment of the invention, showing the embodiment in its position of use in a fluid system.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

Referring to the drawing there is shown a system in an automotive vehicle, including an oil reservoir 10 for feeding oil to the pump 12, said pump having an output line 14 for feeding oil to the inlet chamber 16 of the valve means generally designated by numeral 18. The valve means is provided with an outlet chamber 20 which connects with a discharge line 22 leading back to the oil reservoir. The oil in this system is utilized to operate the clutch 24 for the fan 26, the arrangement being such that when the valve element 28 is in a closed position as illustrated, the pump pressure is applied to engage the clutch and thereby permit the vehicle engine to operate the fan 26. When the valve element 28 is moved downwardly to an open position the pump pressure is ineffective to maintain the clutch in the engaged position, and the fan 26 is thereby disconnected from the engine to conserve on power when the fan is not needed.

The fan is of course only operated when the engine coolant radiator temperature reaches a predetermined high value, and the valve element 28 is preferably opened and closed in response to variations in temperature of the engine coolant flowing through the radiator. In the illustrated embodiment the coolant is fed to the radiator through a line 30 which has a portion thereof communicating with the thermostatic power element generally indicated by numeral 32, the arrangement being such that as the coolant temperature rises to a relatively high temperature the power element is caused to move the valve element 28 to its closed position so as to engage the clutch 24 and thereby permit operation of fan 26. Conversely, as the coolant temperature drops to a lower value the thermostatic power element 32 has its temperature-responsive portion placed in a contracted condition such as to permit the valve element 28 to be moved to an open position in a manner to disengage the clutch 24.

As previously indicated, proper operation of the clutch is facilitated by a rapid movement of the valve element 28 during both its opening and closing movements. In the illustrated embodiment this snapping motion of the valve element is obtained by reason of the cooperating action between thermostatic power element 32 and the force-transmitting mechanism between it and the valve element.

The illustrated thermostatic power element 32 comprises a container structure defined by a metal cup portion 34 and a cover portion 36 clamped thereto by means of a flange structure 38. The cover portion includes an externally threaded tubular portion 40 adapted to be threaded into threaded bore 42 in the extension 44 of the valve body means 18. Extension 44 is in turn adapted to thread into the tubular projection 46 of the coolant line 30, whereby the valve means 18 is operatively positioned adjacent line 30 and power element 32 is operatively positioned within line 30 so as to be responsive to coolant temperature changes. The power element can be locked in a properly calibrated position of adjustment by means of the lock nut 48.

In the illustrated embodiment the thermostatic power element includes a pellet 50 of solid thermally expansible material such as wax, dibromobenzine, or other similar solid expansion material which on temperature change is transformed from a solid state to a liquid state, with accompanying volumetric increase and corresponding development of pressure on the undersurface of rubber diaphragm 52. The pellet may suitably have disposed therethrough finely divided particles of aluminum, copper, or other material for the purpose of promoting rapid pellet volume change in response to ambient temperature change.

It will be seen from the drawing that the rubber diaphragm is clamped between the container sections 34 and 36 so that its peripheral edge portions are anchored and so that its center portion is adapted to be stretched into the bore structure generally indicated by numeral 54. The upper surface of the diaphragm engages a plug 56 of rubber or other deformable material, the action being such that as the diaphragm is moved upwardly to its illustrated position the plug is moved bodily upwardly in the bore structure 54 so as to drive the piston 58 upwardly in the guide bore defined by tubular section 40. The rubber plug material has a tendency to extrude into the clearance space between the piston and the guide bore, and in order to prevent such action there is preferably provided a thin plastic disc 60 of polytetrafluoroethylene or other similar material having the action of preventing extrusion of the rubber plug.

It will be understood that expansion pellet 50 develops a considerable pressure on the diaphragm and that this relatively high pressure is transmitted to the piston 58 so that the piston is able to develop a large operating force on the stem 62.

The stem extends upwardly from piston 58 into the hollow interior of the valve element 28 to a termination point 84. It will be noted that the valve element includes two valve element sections 64 and 66 interconnected together to form the valve surface 68, the arrangement being such that when the valve element is in its illustrated position valve surface 68 closes the port 70 so as to prevent substantial flow between inlet chamber 16 and outlet chamber 20. It will be noted that the valve element section 64 is of greater diameter than valve element section 66, and that the effective area of element 64 is therefore greater than the effective area of section 66. By this arrangement the pressure differential across port 70 is effective during valve element-closing movement to snap the valve element to its illustrated fully closed position as will be explained hereinafter. A small bypass duct is provided at 71 to permit a small continuous liquid flow in the system, said small flow being useful in promoting better operation of pump 12 during the periods when element 28 is closed.

The valve element section 64 is provided with an insert 72 which defines a stop shoulder 74 for limiting the upward movement of a slidable disc or piston 76 under the impetus of compression spring 78. The compression spring and insert 72 are retained in place within valve element 28 by means of a cap 80 secured to the valve element by the inturned flange structure 82.

The stem 62 extends freely through cap 80 and disc 76 so as to have its upper end 84 in releasable abutting engagement with the separately formed spring retainer 86. It will be seen that spring retainer 86 is slidably positioned within valve element section 66 so as to receive the force of contained compression spring 88, said spring serving as an overtravel mechanism for absorbing excess travel of the thermostatic piston 58 after the valve element has been moved to its illustrated fully closed position. By this arrangement parts damage to the valve element, stem structure, or other mechanism is prevented. Improper guiding or canting of the valve element is avoided by use of the piston-like extension 90 operating within the cylindrical surface 92 of the valve body means.

Stem 62 carries a thrust ring 94 which has a very important function in the operation of the valve element, since by the use of this thrust ring the downward movement of the stem is transmitted into an opening movement of the valve element 28. The motive force for moving the stem downwardly is provided by the heavy compression spring 96 which is trained between the fixed abutment 98 and the movable spring retainer 100, connection of retainer 100 to the stem 62 being effected by means of a thrust ring 102 which is fixedly carried on the stem and has a releasable contact with retainer 100. The arrangement of parts is such that the stem under certain operational conditions can have movement relative to the retainer 100 without any interference therefrom.

In operation of the illustrated mechanism, assuming that the valve structure is in its illustrated position, the chamber 16 will be closed to the chamber 20 by means of the valve element 28, and the clutch 24 will be engaged. At this time the temperature in coolant line 30 will be relatively high, and the thermostatic pellet 50 will be in its illustrated expanded condition maintaining the stem 62 raised. When the temperature in line 30 is lowered pellet 50 will begin to contract and the spring 96 will move the stem 62 downwardly in accordance with the pellet contraction. During this downward movement of stem 62 the thrust ring 94 will engage the disc 76, and on continued downward movement of the stem spring 78 will be progressively loaded until a predetermined downward force is exerted thereby on the cap structure 80 of the valve element. The loading of spring 78 will oppose the fluid pressure in the inlet chamber, and the valve element 28 will remain in its closed position for a substantial movement of the disc 76 downwardly under the pressure of ring 94. However, after the disc 76 has been moved downwardly by a predetermined amount the loading of spring 78 will have been increased sufficiently to overcome the fluid pressure in the inlet chamber and thereby crack or snap the valve element 28 to its open position. In this connection it will be understood that as the valve element begins to open the pressure differential across the port 70 will decrease, and spring 78 will thereby work against a relatively small fluid pressure force after the initial opening period. The spring will be enabled to rapidly crack the valve element to a fully opened position even though the stem 62 will be moving at a relatively slow rate in the downward direction during this period. During this downward movement the pellet 50 will be undergoing a contraction but the rate of contraction will of course be relatively slow as compared with the desired rate of movement of the valve element as it is snapped to the open position. Nevertheless, the power element operator will not interfere with the valve element opening movement since the force for the movement is developed from the spring 78 as buttressed by the thrust ring 94. When the valve element snaps open the pressure applied to the clutch through line 14 naturally decreases sufficiently to permit automatic clutch disengagement.

The thermostatic power element 32 may remain in its low temperature condition for a period of time so as to leave the clutch 24 in the disengaged condition. However, at some point in the cycle the power element may have its temperature elevated by the surrounding coolant material so as to expand its pellet 50 toward the illustrated position. As the pellet expands it moves the plug 56 bodily upwardly in the bore 54 so as to drive the piston 58 and stem 62. The spring 96 may be compressed during this period of temperature increase, but the high pressures developed by the pellet 50 are effective to overcome the spring resistance and drive the stem upwardly. As the stem is driven upwardly its end 84 applies a pressure onto the piston 86 which acts in opposition to the spring 88, the arrangement being such that the valve element 28 is maintained in a floating condition on the stem with some compression of the spring 88. While the valve element is in an open condition the fluid flowing through the port 70 acts thereon to oppose element 28 in its closing movement. As a result the valve element is retarded in its movement toward its closed position, and the piston 86 has a relative movement upwardly in section 66. In this manner the spring 88 is progressively loaded. While the valve element is still some distance away from the port it begins to throttle the flow through the port so that the fluid tends to be bottled up to a certain extent in the inlet chamber 16 in such manner as to establish a substantial pressure differential across the port. As previously noted, the valve element section 64 is of greater effective area than the valve element section 66, and the pressure differential is therefore effective to cooperate with the spring 88 in snapping the valve element to its fully closed position. During this snapping action the valve element has a rapid movement on the stem 62, and the stem and power element 32 offer no substantial resistance to the final snapping action. In this connection it will be understood that just prior to the snapping motion the thrust ring 94 will be located closely adjacent valve element surface 106 so that during the snapping period the valve element can move rapidly upwardly relative to the stem 62 without danger that disc 76 will strike the ring 94. The arrangement is such that the "high power" advantages of the thermostatic power element 32 are utilized in combination with the "snap acting" advantages of the force-transmitting mechanism between the stem and valve element to provide quick closing of the valve element even when the controlled fluid is moving under considerable pressure. The arrangement is thus well adapted for high pressure applications requiring quick opening and closing movements of the valve element.

The drawings necessarily illustrate a particular embodiment of the invention, but it will be appreciated that various modifications may be resorted to without departing from the spirit of the invention as set forth in the appended claims.

I claim:
1. In a snap-action fluid flow control valve, a valve body defining an inlet chamber and an outlet chamber with an annular valve port therebetween, a hollow, elongated valve element having a lower partly closed end, said valve element having a restricted upper cylindrical portion freely movable through said port and an enlarged lower portion adjacent said restricted upper cylindrical portion defining a valve surface operable to close said annular valve port, a first annular shoulder centrally of the interior of said valve element, a first movable piston within said valve element above said first annular shoulder, a spring between the upper closed end of said valve element and said first piston, urging said first piston toward said first annular shoulder, a second annular shoulder spaced beneath said first annular shoulder, a second movable annular piston within said valve element beneath said second annular shoulder and adapted to engage the same, a spring between the lower partly closed end of said valve element and said second annular piston urging said piston toward said second annular shoulder, an elongated valve stem having one end extending through the lower end of said valve element and adapted to contact said second annular piston, an abutment secured on said stem between said first annular shoulder and said second annular piston, spring means biasing said stem normally downward in a direction out of said valve element, and means for moving said valve stem into said valve body in engaging relationship with said first piston for actuating said valve element.

2. In a snap-action fluid flow control valve, a valve body defining an inlet chamber and an outlet chamber with an annular valve port therebetween, a hollow, elongated valve element having a lower open end, said valve element having a restricted upper cylindrical portion freely movable through said port and an enlarged lower portion adjacent said restricted upper cylindrical portion defining an annular valve operable to close said annular valve port, a first annular shoulder centrally of the interior of said valve element, a solid movable piston within said valve element above first annular shoulder, means engaging said valve element and biasing said piston toward said first annular shoulder, a second annular shoulder spaced beneath said first annular shoulder, an annular movable piston within said valve element beneath said second annular shoulder and adapted to move into engagement therewith, means engaging said valve element and biasing said annular piston toward said second annular shoulder, a valve stem having one end extending through the lower open end of said valve element and adapted to contact said solid piston, an abutment element secured to said stem and positioned in spaced relationship between said first annular shoulder and said annular piston, means biasing said stem in a direction out of said valve element, and means for moving said stem into and out of said valve body in engageable relation with said solid piston for actuating said valve element.

References Cited in the file of this patent
UNITED STATES PATENTS
2,661,148    Englander _____ Dec. 1, 1953